(12) United States Patent
Kawano et al.

(10) Patent No.: US 8,732,414 B2
(45) Date of Patent: May 20, 2014

(54) CONTROL DEVICE, CONTROLLER MODULE, AND CONTROL METHOD

(75) Inventors: Yoko Kawano, Kawasaki (JP); Yuji Hanaoka, Kawasaki (JP); Atsushi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 13/170,740

(22) Filed: Jun. 28, 2011

(65) Prior Publication Data

US 2012/0005436 A1  Jan. 5, 2012

(30) Foreign Application Priority Data

Jul. 2, 2010 (JP) ................................. 2010-152146

(51) Int. Cl.
*G06F 12/00* (2006.01)
(52) U.S. Cl.
USPC ..................... 711/154; 711/103; 711/E12.001
(58) Field of Classification Search
USPC .................... 711/103, 154, E12.001
See application file for complete search history.

(56) References Cited

U.S. PATENT DOCUMENTS

| | | | |
|---|---|---|---|
| 5,530,673 A * | 6/1996 | Tobita et al. | 365/185.09 |
| 5,864,661 A | 1/1999 | Ohara | |
| 2008/0307152 A1 * | 12/2008 | Nakanishi et al. | 711/102 |
| 2009/0240868 A1 * | 9/2009 | Tan et al. | 711/103 |
| 2010/0088502 A1 * | 4/2010 | Chen et al. | 713/2 |

FOREIGN PATENT DOCUMENTS

| | | |
|---|---|---|
| JP | 7-306922 | 11/1995 |
| JP | 9-305327 | 11/1997 |
| JP | 2002-032256 | 1/2002 |
| JP | 2002-116942 | 4/2002 |

OTHER PUBLICATIONS

Office Action issued by the Japanese Patent Office on Jan. 7, 2014 in the corresponding Japanese patent application No. 2010-152146.

* cited by examiner

*Primary Examiner* — Reginald Bragdon
*Assistant Examiner* — Mehdi Namazi
(74) *Attorney, Agent, or Firm* — Staas & Halsey LLP

(57) ABSTRACT

A control device including: a storage device that includes a first storage area including a plurality of blocks into which data can be written more than once and a second storage area into which data can be written only once, wherein the first storage area further stores a flag for each of the blocks, the flag indicating whether or not the block is allowed to be used; a flag management information creation unit configured to create, on the basis of the flag, a flag management information for managing whether or not data can be stored in each block of the storage device; and a management information controller configured to cause the flag management information to be stored in the second storage area.

8 Claims, 12 Drawing Sheets

CONTROL DEVICE, CONTROLLER MODULE, AND CONTROL METHOD

CROSS-REFERENCE TO RELATED APPLICATION

This application is based upon and claims the benefit of priority of the prior Japanese Patent Application No. 2010-152146, filed on Jul. 2, 2010, the entire contents of which are incorporated herein by reference.

FIELD

The present invention relates to a control device, controller module, and a control method.

BACKGROUND

There has been a flash memory used for a backup of data or the like.

Once data is written into the flash memory, it is impossible to overwrite data in units of pages. In addition to this, when data is rewritten, it is necessary to write changed data again after collectively erasing data in units called blocks. The flash memory has such a characteristic as described above. In addition, there is a restriction of the guaranteed number of times a block is erased (for example, about a million times), and it is noted that when the number of times a block is erased exceeds the guaranteed number, a case may occur in which the block is changed to a block, called a defective block, in which the value of written data is not ensured.

In addition, in some cases, when a flash memory is manufactured and completed, a defective block exists in the flash memory owing to the manufacturing process thereof or the like.

As a method for managing a defective block, there has been a method in which block state management means for managing a defective block in the flash memory have been stored in the flash memory and these block state management means are generated on memory means including a volatile memory, at the time of system initialization after power activation.

Here, when the block state management means stored in the flash memory is erased for any reason or when the storage point of the block state management means stored in the flash memory is lost, a processing operation for creating the block state management means again is performed.

However, for example, if information stored in all blocks of the flash memory is erased once and a procedure for rereading a defective block or the like is performed, so as to identify the defective block, at the time of the re-creation of the block state management means, a case may occur in which information for identifying the defective block disappears from the flash memory. In this case, a position that is primarily a defective block seems to be a valid block, and a problem occurs in which the reliability of data stored in the flash memory after that is reduced.

In addition, while the flash memory has been described, the same problem occurs in another semiconductor memory in which data can be rewritten and electrically erased.

An example of the related art is Japanese Laid-open Patent Publication No. 2002-32256.

SUMMARY

According to an embodiment, a control device including: a storage device that includes a first storage area including a plurality of blocks into which data can be written more than once and a second storage area into which data can be written only once, wherein the first storage area further stores a flag for each of the blocks, the flag indicating whether or not the block is allowed to be used; a flag management information creation unit configured to create, on the basis of the flag, a flag management information for managing whether or not data can be stored in each block of the storage device; and a management information controller configured to cause the flag management information to be stored in the second storage area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an operation of the controller module at the time of first power-on;

FIG. 6 is a diagram illustrating an operation of the controller module at the time of a second or subsequent power-on;

DESCRIPTION OF EMBODIMENTS

Hereinafter, an embodiment will be described in detail with reference to figures. First, a control device according to the embodiment will be described, and, after that, the embodiment will be more specifically described.

First Embodiment

Figure 1:
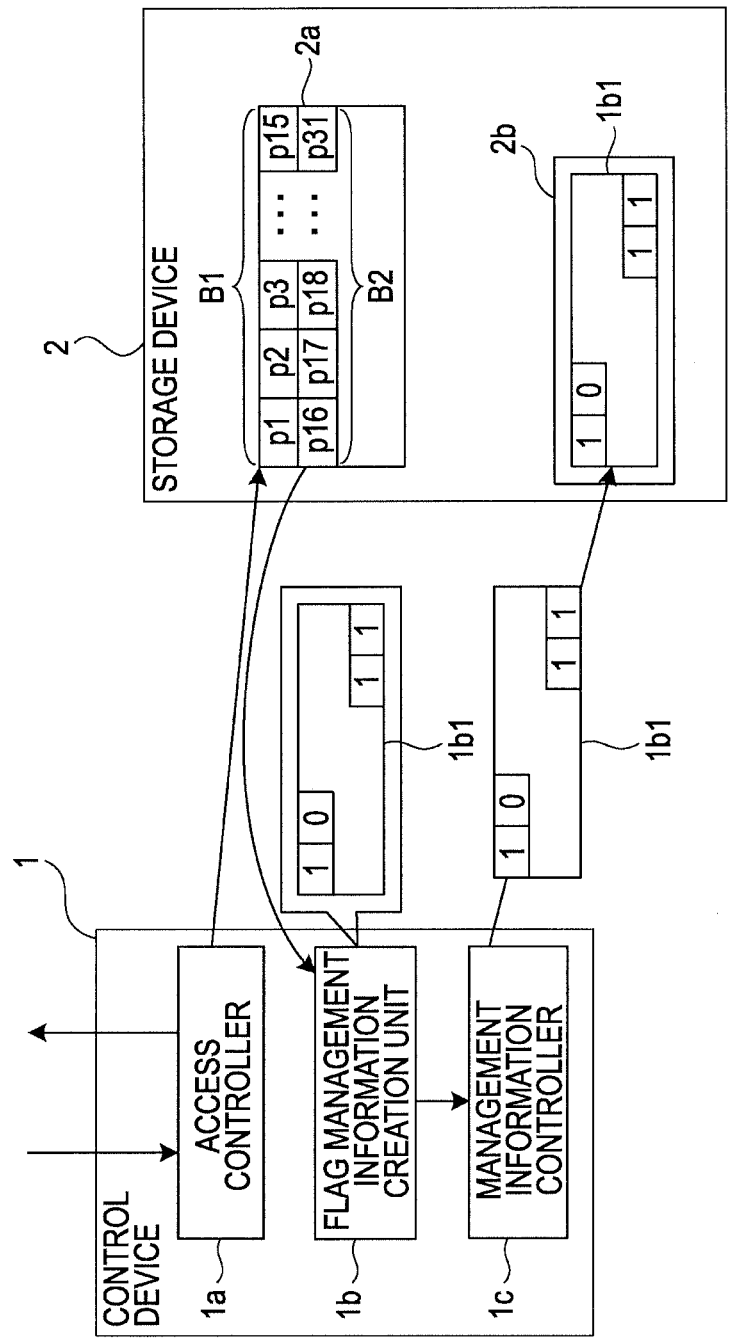
FIG. 1 is a diagram illustrating the summary of a control device according to a first embodiment.

FIG. 1 is a diagram illustrating the summary of a control device according to a first embodiment.

The control device 1 according to the first embodiment controls a storage device 2. The storage device 2 is a device in which data can be rewritten and electrically erased, and examples of the storage device 2 include a flash memory, an electrically erasable and programmable ROM (EEPROM), and the like.

The storage device 2 includes a first storage area 2a including a plurality of blocks into which data can be written more than once and a second storage area 2b into which data can be written only once (it is not able to rewrite and erase data).

For example, when the first storage area 2a is a flash memory, the writing of data into the first storage area 2a is performed in units called pages. FIG. 1 illustrates pages p1, p2, p3, . . . , and p15. In addition, when the first storage area 2a is the flash memory, the erasure of data written into a memory cell is performed in units of blocks each of which includes a plurality of pages. In FIG. 1, block B1 includes the pages p1, p2, p3, . . . , and p15. Block B2 includes pages p16, p17, p18, p31.

In the first storage area 2a, a flag that indicates whether or not a block is allowed to be used is stored with respect to each block. In FIG. 1, the flag of the block B1 is stored in the page p1. The flag of the block B2 is stored in the page p16.

The second storage area 2b illustrated in FIG. 1 indicates the second storage area 2b in an initial state. The second storage area 2b in an initial state is put into a data-erased state that is a state in which all bits thereof are in a state of "1".

In addition, it is desirable that the second storage area 2b is a region that is ensured in advance that all blocks are allowed to be used by a verification test or the like. Accordingly, it is possible to improve the reliability of data stored in the storage device 2.

The control device 1 includes an access controller 1a, a flag management information creation unit 1b, and a management information controller 1c.

The access controller 1a controls writing data into the storage device 2 or reading out data from the storage device 2.

On the basis of the flag stored in the first storage area 2a, the flag management information creation unit 1b creates a management table (flag management information) 1b1 that stores information indicating whether or not data can be stored with respect each block in the storage device 2. In the management table 1b1 illustrated in FIG. 1, a bit "1" which indicates that it is possible to store data in the block B1 is stored, on the basis of the flag stored in the page p1. In addition, a bit "0" which indicates that it is not possible to store data in the block B2 is stored, on the basis of the flag stored in the page p16.

The management information controller 1c causes the management table 1b1 created by the flag management information creation unit 1b to be stored in the second storage area 2b. In addition, the management information controller 1c may cause the created management table 1b1 to be stored in the second storage area 2a.

According to the control device 1, the management information controller 1c causes the management table 1b1 to be stored in the second storage area 2b, and allowing a factory default flag to be stored in the second storage area 2b. The factory default flag is held in the second storage area 2b. Therefore, even if the management table 1b1 stored in the first storage area 2a disappears or the storage position of the management table 1b1 stored in the first storage area 2a is lost, the state of a flag in the first storage area 2a can be recognized by reading out the management table 1b1 stored in the second storage area 2b. Accordingly, it is possible to prevent data from being written into a block in the first storage area 2a, into which data is not allowed to be written, and hence the reliability of information management can be improved.

In addition, while, in the present embodiment, whether or not the management table 1b1 can store data therein is managed in units of blocks, a unit in which whether or not the management table can store data therein is managed is not limited to the example.

Hereinafter, the embodiment will be described more specifically.

Second Embodiment

Figure 2:
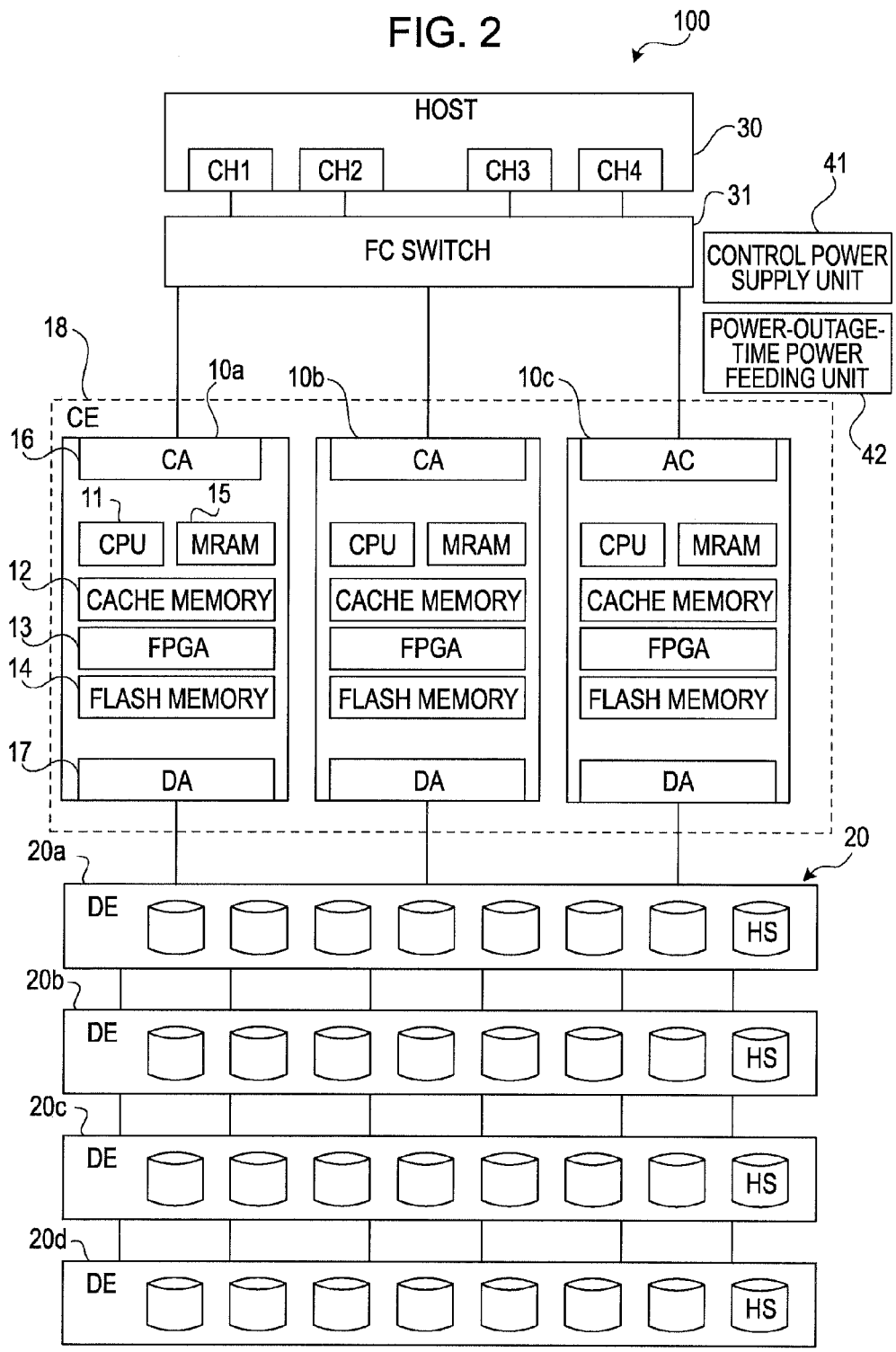
FIG. 2 is a block diagram illustrating a storage system according to a second embodiment.

FIG. 2 is a block diagram illustrating a storage system according to a second embodiment.

A storage system 100 includes a host computer (hereinafter, simply referred to as "host") 30, controller modules (CMs) 10a, 10b, and 10c performing operation control for disks, and drive enclosures (DEs) 20a, 20b, 20c, and 20d included in a drive enclosure group 20.

In the storage system 100, the drive enclosures 20a, 20b, 20c, and 20d are connected to the host 30 through the controller modules 10a, 10b, and 10c.

The storage system 100 includes more than one controller module used for an operation, and hence the redundancy thereof is ensured.

The controller modules 10a, 10b, and 10c are implemented in the controller enclosure (CE) 18. Each of the controller modules 10a, 10b, and 10c functions as a storage control device.

In addition, while, in FIG. 2, one host 30 is illustrated, a plurality of hosts may be connected to the controller enclosure 18.

Each of the controller modules 10a, 10b, and 10c transmits, as access instruction information, an I/O command to the drive enclosures 20a, 20b, 20c, and 20d, and executes an input-output command of data for a storage area in the storage device. In addition, when no response is obtained after an access monitoring time has elapsed since the input-output command, an abort instruction command for interrupting the I/O processing is transmitted to the drive enclosures 20a, 20b, 20c, and 20d.

The drive enclosure group 20 including the drive enclosures 20a, 20b, 20c, and 20d has a Redundant Arrays of Inexpensive Disks (RAID) configuration in which redundancy is considered.

The whole device of the controller module 10a is controlled by a central processing unit (CPU) 11.

A cache memory 12, a Field Programmable Gate Way (FPGA) 13, a NAND-type flash memory (simply expressed as "flash memory" in FIG. 2) 14, a Magneto Resistive RAM (MRAM) 15, a channel adapter (CA) 16, and a device adapter (DA) 17 are connected to the CPU 11 through an internal bus.

At least a portion of a program to be executed by the CPU 11 is temporarily stored in the cache memory 12. In addition, various kinds of data necessary for processing performed by the CPU 11 are stored in the cache memory 12.

The FPGA 13 controls the NAND-type flash memory 14. The FPGA 13 corresponds to the control device 1 according to the first embodiment. In addition, the content of a control operation performed in the FPGA 13 will be described later.

The NAND-type flash memory 14 is a nonvolatile memory, and includes a storage area that is the destination of data to save at the time of power outage or the like.

In addition, the NAND-type flash memory 14 includes a storage area in which a defective block management table described later is stored.

The NAND-type flash memory 14 has a structure in which the NAND-type flash memory 14 can be attached and detached to and from the controller module 10a.

The MRAM 15 is a nonvolatile memory, and includes a storage area in which the storage position of the defective block management table stored in the NAND-type flash memory 14 is stored.

The channel adapter 16 is connected to a fibre channel (FC) switch 31, and is connected to channels CH1, CH2, CH3, and CH4 in the host 30 through the fibre channel switch 31. Through the pathway, the host 30 transmits and receives data to and from the CPU 11.

The device adapter 17 is connected to the external drive enclosures 20a, 20b, 20c, and 20d included in the drive enclosure group 20. The CPU 11 transmits and receives data to and from the external drive enclosures 20a, 20b, 20c, and 20d through the device adapter 17.

A control power supply unit 41 is connected to the controller modules 10a, 10b, and 10c. The control power supply unit 41 supplies, to the controller modules 10a, 10b, and 10c, drive power used for driving the controller modules 10a, 10b, and 10c.

A power-outage-time power feeding unit 42 is connected to the controller modules 10a, 10b, and 10c.

The power-outage-time power feeding unit 42 includes therein a capacitor (not illustrated). When the control power supply unit 41 operates, namely, the control power supply unit 41 supplies power to the controller modules 10a, 10b, and 10c, the power-outage-time power feeding unit 42 receives power supplied from the control power supply unit 41 and store electric power in the capacitor included therein.

In addition, when the operation of the control power supply unit 41 is suspended, for example, at the time of power outage or the like, the power-outage-time power feeding unit 42 supplies, to the controller modules 10a, 10b, and 10c, electric power stored in the capacitor included therein.

On the basis of the supplied electric power, the controller modules 10a, 10b, and 10c cause information, stored in the cache memory 12, to be saved in the NAND-type flash memory 14.

In addition, the hardware configurations of the controller modules 10b and 10c are also the same as that of the controller module 10a. Using such a hardware configuration as described above, the processing functions of the controller modules 10a, 10b, and 10c can be realized.

Figure 3:
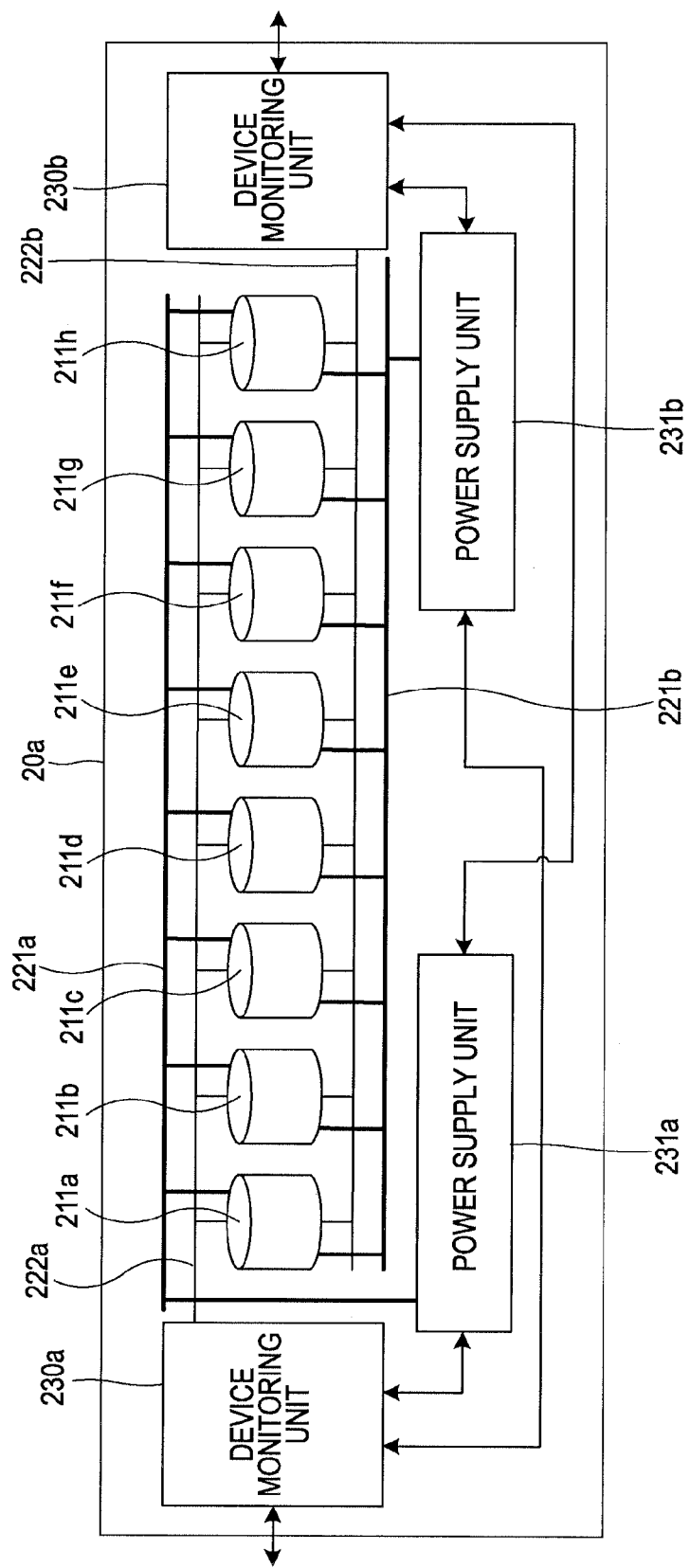
FIG. 3 is a diagram illustrating an example of a drive enclosure.

FIG. 3 is a diagram illustrating an example of the drive enclosure.

The drive enclosure 20a includes a plurality of storage devices 211a, 211b, 211c, 211d, 211e, 211f, 211g, and 211h and a plurality of power supply units (PSUs) 231a and 231b that supply power source to each of the storage devices 211a to 211h through power pathways 221a and 221b, respectively. Furthermore, the drive enclosure 20a includes a plurality of device monitoring units (Port Bypass Circuits: PBCs) 230a and 230b connected to each of the storage devices 211a to 211h through the input-output pathways 222a and 222b, respectively.

Electric power is supplied to each of the storage devices 211a to 211h from both of the power supply units 231a and 231b.

Each of the power supply units 231a and 231b has an ability to supply enough electric power to cause all the storage devices 211a to 211h included in the drive enclosure 20a to simultaneously operate or a predetermined number of storage devices from among all the storage devices 211a to 211h to be simultaneously activated.

In this way, since the power supply units 231a and 231b have redundant configurations, it is possible to suppress the supply stop of electric power to the storage devices 211a to 211h even if one of the power supply units fails to operate properly.

The device monitoring units 230a and 230b read out information stored in each of the storage devices 211a to 211h or write information into each of the storage devices 211a to 211h, on the basis of an instruction from each of the controller modules 10a to 10c.

Furthermore, the device monitoring units 230a and 230b monitor each of the storage devices 211a to 211h, and detect an operation state (operation, activation, or halt) of each of the storage devices 211a to 211h. Here, the term "operation" indicates a stable state after activation, and, in the operation state, write processing or read processing for data is performed.

Furthermore, the device monitoring unit 230a and 230b monitor each of the power supply units 231a and 231b, and perform the detection of the operation mode of each of the power supply units 231a and 231b and failure detection. Furthermore, the device monitoring units 230a and 230b detect the maximum amounts of electric power that the power supply units 231a and 231b can supply and the used amounts of electric power that the power supply units 231a and 231b currently use.

In addition, the other drive enclosures 20b to 20d also have the same structures as that of the drive enclosure 20a.

For example, the drive enclosure group 20 including such drive enclosures 20a to 20d has a RAID structure in which information such as user information or the like is stored in multiple pieces or the same information is individually stored, in a plurality of storage devices from among storage devices included in each of the drive enclosures 20a to 20d.

In addition, the drive enclosure group 20 includes a plurality of RAID groups individually including one or a plurality of storages from among the storage devices included in each of the drive enclosures 20a to 20d. Here, in the drive enclosure group 20, a logical volume is set for each of the RAID groups. In addition, while, here, a RAID group and a logical volume match each other, a relationship between the RAID group and the logical volume is not limited to this example, and one logical volume may be provided for a plurality of RAID groups or a plurality of logical volumes may be provided for one RAID group. In addition, while, in FIGS. 2 and 3, each of the drive enclosures 20a to 20d includes eight storage devices 211a to 211h, the structure of each of the drive enclosures 20a to 20d is not limited to this example, and an arbitrary number of storage devices may be included therein.

Next, a function included in the controller module 10a will be described in more detail.

Figure 4:
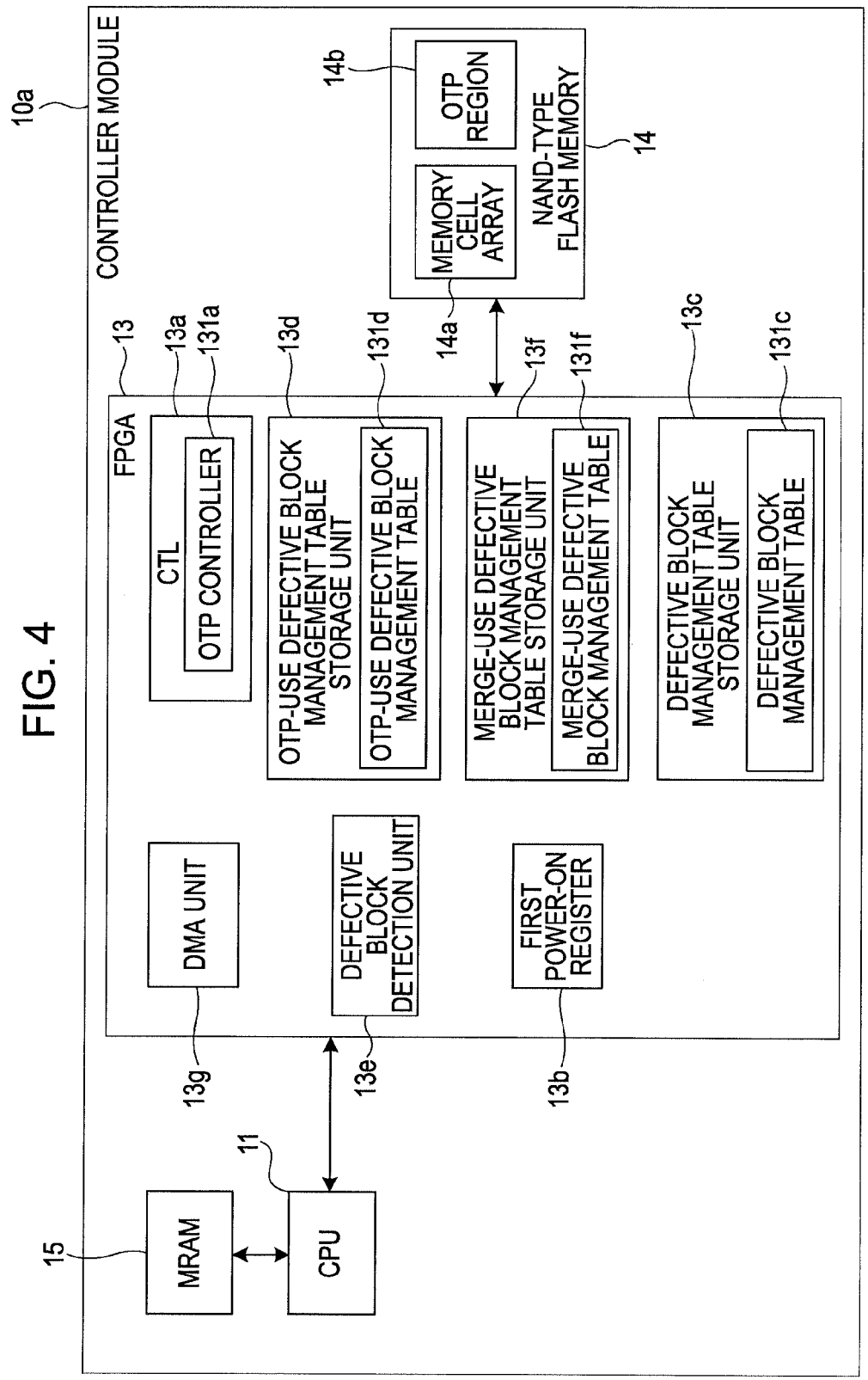
FIG. 4 is a block diagram illustrating a function of a controller module.

FIG. 4 is a block diagram illustrating the function of the controller module.

As described above, the whole device of the controller module 10a is controlled by the CPU 11.

The cache memory 12, the FPGA 13, the NAND-type flash memory 14, the MRAM 15, the channel adapter 16, and the device adapter 17 are connected to the CPU 11 through the internal bus.

The NAND-type flash memory 14 includes a memory cell array 14a and an OTP region 14b.

In the memory cell array 14a, memory cells from and into which data can be read and written are disposed in a matrix form. Data is written into memory cells in units of pages. Data written into memory cells is erased in units of blocks each of which includes a plurality of pages. In the first page of each of blocks, defective block information (flag) indicating whether or not the corresponding block is a defective block (a block in which the reliability of the value of written data is not ensured) is stored.

In addition, in the memory cell array 14a, a defective block management table is stored in which the defective block information of each block in the memory cell array 14a is individually stored.

The OTP region 14b is a data storage area in which a verification test or the like at the time of factory shipment ensures that there is no defective block.

In an initial state (for example, a factory default state), the OTP region 14b is put into a data-erased state that is a state in which all bits in all storage areas are in a state of "1".

The OTP region 14b is managed in a unit called a page. Data can be written into each page only once, and each page is set up so as not to erase data. In the OTP region 14b, a defective block management table is stored in which the defective block information of each block in the memory cell array 14a is individually stored with respect to each page.

In the present embodiment, in the first page of the OTP region 14b, a defective block management table is stored in which defective block information created at the time of factory shipment is stored. In the second page or a subsequent page in the OTP region 14b, a defective block management table is stored that is newly created when a certain amount of defective blocks occurs. A creation method for the defective block management table stored in the second page or a subsequent page will be described.

In addition, while, in FIG. 4, one NAND-type flash memory 14 is illustrated, the controller module 10a may include a plurality of NAND-type flash memories 14.

The FPGA 13 includes a memory controller (expressed as "CTL" in FIG. 4) 13a, a first power-on register 13b, a defective block management table storage unit 13c, an OTP-use defective block management table storage unit 13d, a defective block detection unit 13e, a merge-use defective block management table storage unit 13f, and a DMA unit 13g.

The memory controller 13a manages the state of a block (the number of empty sectors in a block, whether each physical sector holds valid data, or the like) in the NAND-type flash memory 14.

In addition, the memory controller 13a controls readout of data stored in the NAND-type flash memory 14 and writing of data into the NAND-type flash memory 14. The memory controller 13a includes an OTP controller 131a that controls readout of data stored in the OTP region 14b and writing of data into the OTP region 14b.

The OTP controller 131a writes the defective block management table into the OTP region 14b, or reads out the defective block management table stored in the OTP region 14b.

In addition, the OTP controller 131a confirms whether or not the OTP region 14b in the NAND-type flash memory 14 is in an erased state, namely, all bits of the OTP region 14b are in a state of "1". In addition, when confirming that the OTP region 14b is in an erased state, the OTP controller 131a sets the first power-on register 13b to "1".

In addition, the OTP controller 131a includes a function for creating a defective block management table 131c on the basis of the defective block information of the memory cell array 14a, a function for storing the created defective block management table 131c in the memory cell array 14a, and a function for reading out and storing the defective block management table 131c stored in the memory cell array 14a in the defective block management table storage unit 13c.

In addition, when the number of defective blocks detected by the defective block detection unit 13e described later exceeds a predetermined threshold value, the OTP controller 131a stores a merge-use defective block management table 131f in the OTP region 14b. A determination method for the threshold value will be described later.

The first power-on register 13b is a register that stores a value indicating that whether no error occurs in data in the OTP region 14b or the like is verified. An initial value of the value of the register is "0". The verification relating to whether no error occurs in data in the OTP region 14b or the like is executed at the time of first power activation (hereinafter referred to as "first power-on time") after the NAND-type flash memory 14 is installed in the controller module 10a. After the execution of the verification, the value of the register is set to "1".

In addition, the value of the register is set to "0" (reset) at the time of power-off.

In the defective block management table storage unit 13c, the defective block management table 131c read out from the memory cell array 14a is stored.

When a defective block occurs in the memory cell array 14a during the operation of the controller module 10a, the defective block information of the occurring defective block is reflected in the defective block management table 131c. The defective block management table 131c is stored in the memory cell array 14a.

In the OTP-use defective block management table storage unit 13d, an OTP-use defective block management table 131d reflecting the defective block information of the latest memory cell array 14a is stored. Specifically, at the time of factory shipment, the defective block management table stored in the first page of the OTP region 14b in the NAND-type flash memory 14 is read out and stored in the OTP-use defective block management table storage unit 13d.

In addition, when an updated defective block management table is stored in the second page or a subsequent page of the OTP region 14b, the latest defective block management table stored in the second page or a subsequent page is read out and stored in the OTP-use defective block management table storage unit 13d.

Hereinafter, a page in which the latest defective block management table is stored is referred to as "latest page".

The defective block detection unit 13e detects a defective block newly occurring in the memory cell array 14a at the time of the operation of the storage system 100.

In the merge-use defective block management table storage unit 13f, the merge-use defective block management table 131f is stored.

The merge-use defective block management table 131f is a table including defective block information obtained by performing logical addition (OR) of the defective block information stored in the OTP-use defective block management table 131d to the defective block information stored in the defective block management table 131c.

The memory controller 13a identifies the defective block of the memory cell array 14a on the basis of the defective block information stored in the merge-use defective block management table 131f, and performs a control operation so as not to identify the identified defective block as the destination of data to write.

If receiving the control of bus management from the CPU 11, the DMA unit 13g writes data on a bus into the NAND-type flash memory 14 through a bus controller when the DMA unit 13g receives a transfer request for data from an external device.

In addition, the memory controller 13a, the defective block management table 131c, the OTP-use defective block management table 131d, the merge-use defective block management table 131f, and the DMA unit 13g are provided in the FPGA 13 in response to the number of the NAND-type flash memories 14. For example, when the controller module 10a includes two NAND-type flash memories 14, the memory controller 13a, the defective block management table 131c, the OTP-use defective block management table 131d, the merge-use defective block management table 131f, and the DMA unit 13g are provided for each of the NAND-type flash memories 14.

Next, the operation of the controller module 10a will be described.

When the controller module 10a is powered on, the controller module 10a performs initialization setting.

At the time of the initialization setting, the OTP controller 131a confirms whether or not there is the defective block information of the NAND-type flash memory 14. Specifically, the following operation is performed.

The OTP controller 131a reads out the OTP region 14b in the NAND-type flash memory 14, and confirms whether or not the OTP region 14b is in an erased state. When the OTP region 14b is in an erased state, the OTP controller 131a determines the first power-on. When the OTP region 14b is not in an erased state, the OTP controller 131a determines the second or subsequent power-on.

Hereinafter, the operation of the controller module 10a will be described in order of the operation of the controller module 10a at the time of the first power-on of the controller module 10a and the operation of the controller module 10a at the time of the second or subsequent power-on of the controller module 10a.

<Operation of Controller Module 10a at Time of First Power-on>

Figure 5:
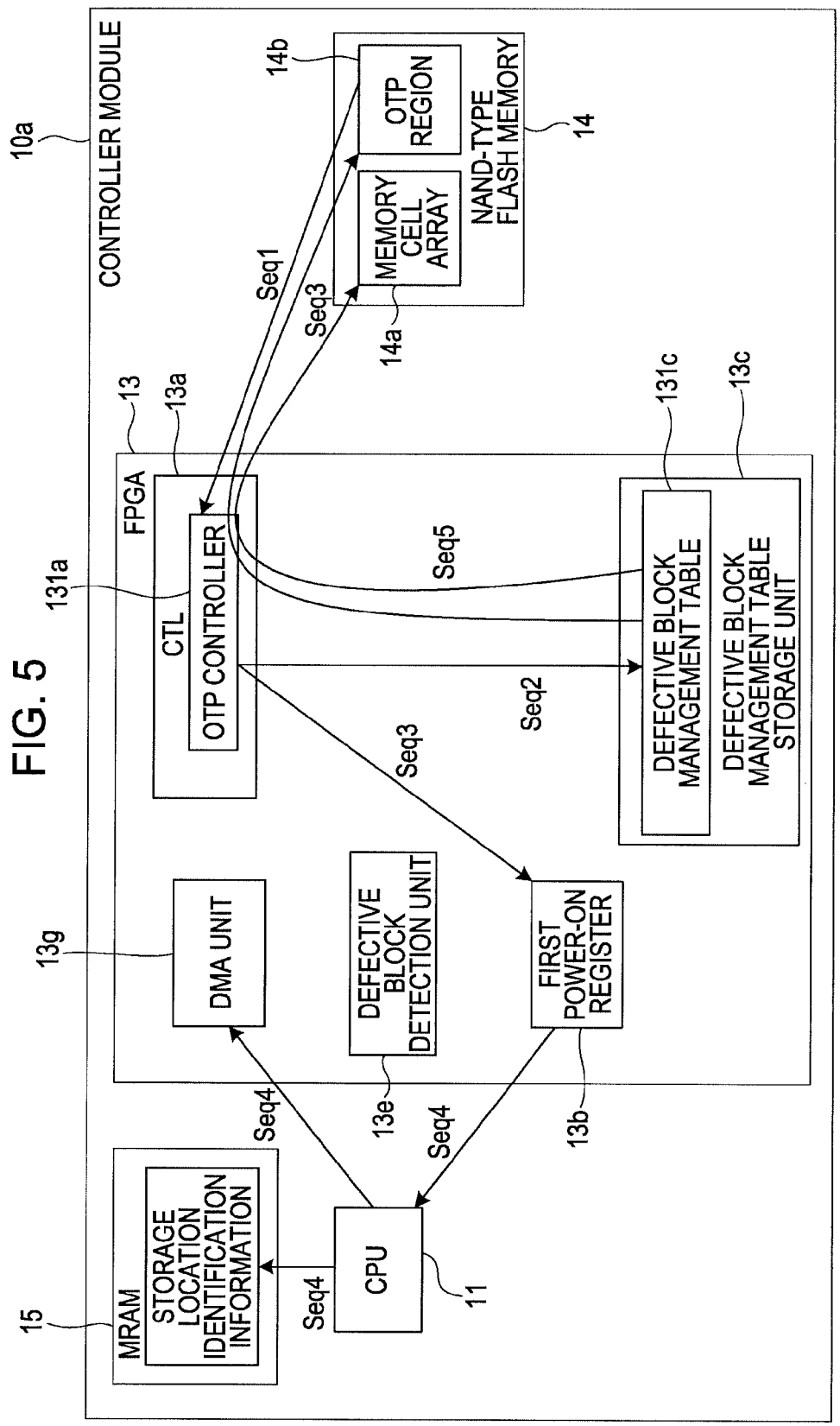

FIG. 5 is a diagram illustrating the operation of the controller module at the time of the first power-on.

[Seq1] As described above, the OTP controller 131a reads out the OTP region 14b in the NAND-type flash memory 14, and confirms whether or not the OTP region 14b is in an erased state. When the OTP region 14b is in an erased state, the OTP controller 131a determines the first power-on.

[Seq2] When determining the first power-on, the OTP controller 131a reads out the storage positions of all defective blocks in the NAND-type flash memory 14, namely, the defective block information stored in the first page of each block in the memory cell array 14a. In addition, on the basis of the read out defective block information, the OTP controller 131a confirms whether or not there is a defective block. In addition, the OTP controller 131a creates the defective block management table 131c storing therein a position where the defective block is present. The OTP controller 131a stores the created defective block management table 131c in the defective block management table storage unit 13c.

[Seq3] Next, the OTP controller 131a writes the created defective block management table 131c into a page in the OTP region 14b in the NAND-type flash memory 14, the page being next to a page into which the defective block management table has been already written. The written page becomes a latest page at present. In addition, after writing the created defective block management table 131c into the OTP region 14b in the NAND-type flash memory 14, the OTP controller 131a sets the register value of the first power-on register 13b to "1".

After that, the OTP controller 131a notifies the CPU 11 of the completion of the initialization setting.

The operation described this far is the initialization setting operation at the time of the first power-on. When the initialization setting operation is finished, the controller module 10a performs operations in Seq4 and Seq5.

[Seq4] When the OTP controller 131a notifies the CPU 11 of the completion of the initialization setting, the CPU 11 confirms that the register value of the first power-on register 13b is "1". When it is confirmed that the register value of the first power-on register 13b is "1", the CPU 11 specifies the memory cell array 14a in the NAND-type flash memory 14 as the storage location of the defective block management table 131c. In addition, the CPU 11 activates the DMA unit 13g in the FPGA. In addition, the CPU 11 notifies the MRAM 15 of the storage location of the defective block management table 131c within the memory cell array 14a. Accordingly, the MRAM 15 stores information (hereinafter, referred to as "storage location identification information") used for identifying the storage location of the defective block management table 131c within the memory cell array 14a.

[Seq5] Owing to the activation of the DMA unit 13g by the CPU 11, the OTP controller 131a writes the defective block management table 131c into the storage location of the defective block management table 131c within the memory cell array 14a, of which the MRAM 15 is notified in Seq4.

This is the end of the description of the operation at the time of the first power-on.

The defective block management table 131c is written into the OTP region 14b in Sequence Seq3, and hence it is possible to store factory default defective block information into the OTP region 14b. The factory default defective block information is held in the OTP region 14b. Therefore, even if the defective block management table stored in the memory cell array 14a disappears or the storage position of the defective block management table stored in the memory cell array 14a is lost, the location of a defective block in the memory cell array 14a can be recognized by reading out the defective block management table stored in the OTP region 14b. Accordingly, it is possible to prevent data from being written into a defective block in the memory cell array 14a, and hence the reliability of information management is improved.

In addition, the FPGA 13 itself can confirm the first power-on of the NAND-type flash memory 14. Accordingly, it is possible to collect the defective block information of the memory cell array 14a without the CPU 11.

Next, the operation of the controller module 10a at the time of the second or subsequent power-on of the controller module 10a will be described.

<Operation of Controller Module 10a at Time of Second or Subsequent Power-on>

Figure 6:
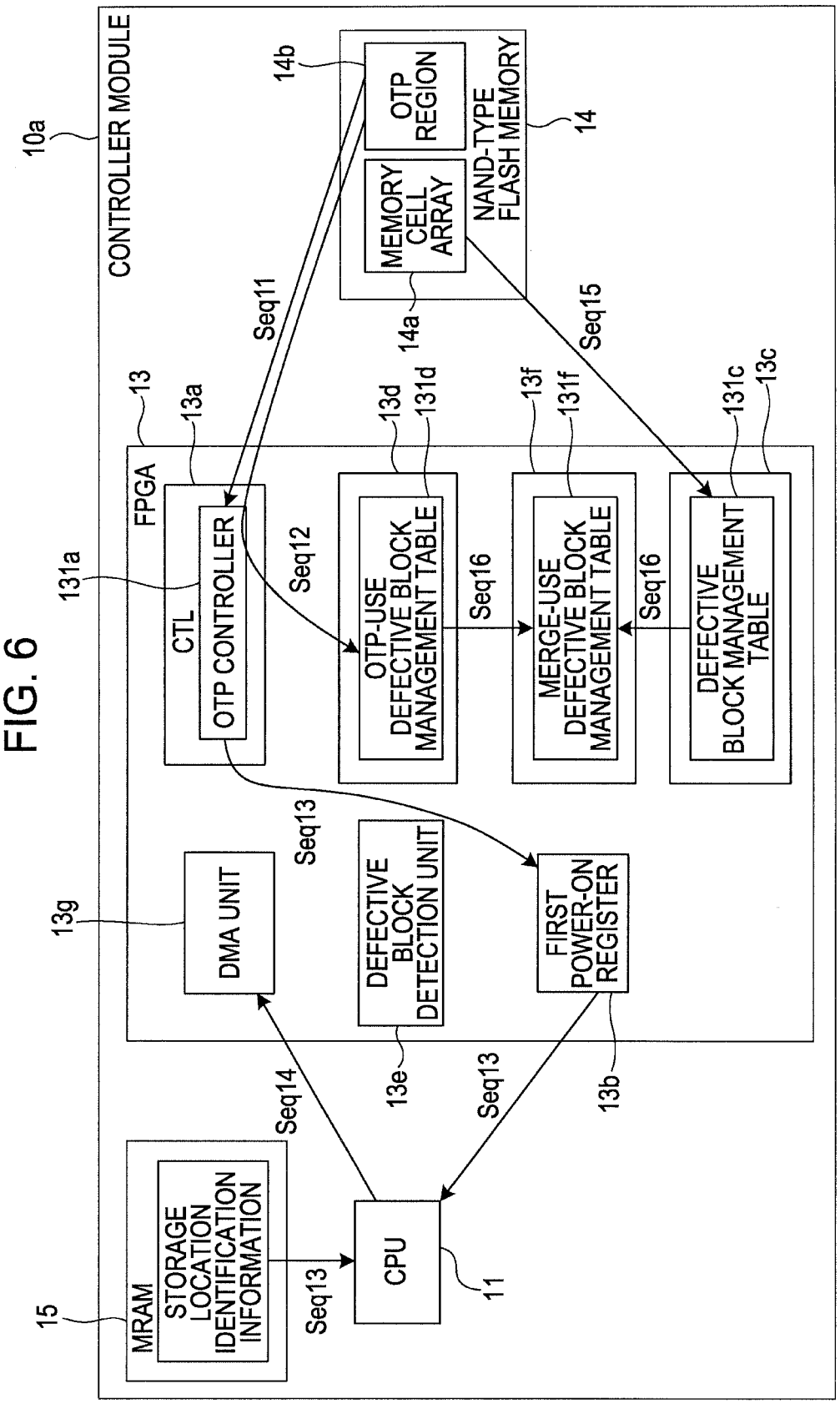

FIG. 6 is a diagram illustrating the operation of the controller module at the time of the second or subsequent power-on.

[Seq11] The OTP controller 131a reads out the OTP region 14b in the NAND-type flash memory 14 and confirms whether or not the OTP region 14b is in an erased state.

Here, owing to the operation performed in Seq3 at the time of the first power-on, the defective block management table is stored in the OTP region 14b. Accordingly, at the time of the second or subsequent power-on, the OTP region 14b is not in an erased state. If the OTP region 14b is not in an erased state, the OTP controller 131a determines the second or subsequent power-on. At this time, the register value of the first power-on register 13b remains "0".

[Seq12] When determining the second or subsequent power-on, the OTP controller 131a reads out the defective block management table stored in the latest page, from the OTP region 14b in the NAND-type flash memory 14. For example, the OTP controller 131a refers to a CRC code attached to the defective block management table, thereby allowing the defective block management table stored in the latest page to be identified.

In addition, the OTP controller 131a stores the read our defective block management table in the OTP-use defective block management table storage unit 13d within the FPGA 13. After that, the OTP controller 131a notifies the CPU 11 of the completion of the initialization setting.

The operation described this far is the initialization setting operation at the time of the second or subsequent power-on. When the initialization setting operation is finished, the controller module 10a performs operations in Seq13 to Seq16.

[Seq13] When the OTP controller 131a notifies the CPU 11 of the completion of the initialization setting, the CPU 11 confirms the register value of the first power-on register 13b. When it is confirmed that the register value of the first power-on register 13b is "0", the CPU 11 determines the second or subsequent power-on, accesses the MRAM 15, and confirms the storage location of the defective block management table within the memory cell array 14a, on the basis of the storage location identification information.

[Seq14] The CPU 11 sets (identifies) the storage location of the defective block management table within the memory cell array 14a, and activates the DMA unit 13g in the FPGA 13.

[Seq15] Owing to the activation of the DMA unit 13g by the CPU 11, the OTP controller 131a reads out the defective block management table within the memory cell array 14a. In addition, the OTP controller 131a stores the read our defective block management table in the defective block management table storage unit 13c within the FPGA 13.

[Seq16] The OTP controller 131a stores, in the merge-use defective block management table 131f, a value obtained by performing logical addition of each of pieces of the defective block information of the defective block management table 131c stored in the defective block management table storage unit 13c to each of pieces of the defective block information of the OTP-use defective block management table 131d stored in the OTP-use defective block management table storage unit 13d.

As described above, when a defective block occurs in the memory cell array 14a during the operation of the controller module 10a, the defective block information of the occurring defective block is reflected in the defective block management table 131c. Accordingly, owing to the execution of the processing in Seq16, in the merge-use defective block management table 131f, defective block information reflecting the state of the defective block in the memory cell array 14a at present (after the OTP-use defective block management table 131d is read out from the OTP region 14b) is stored.

Figure 7:
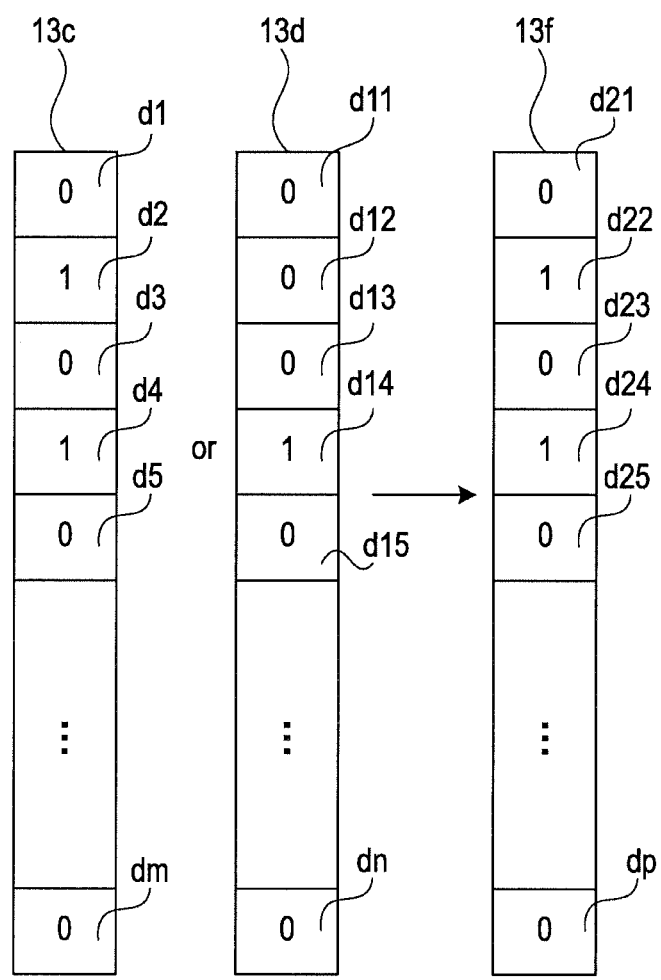
FIG. 7 is a diagram explaining a defective block management table.

FIG. 7 is a diagram explaining the defective block management table.

As described above, in the defective block management table 131c, the defective block information of each block is stored.

Here, a block marked with "0" indicates that the block is not a defective block. A block marked with "1" indicates that the block is a defective block.

Pieces of defective block information d1, d2, d3, d4, d5, . . . , and dm stored in the defective block management table 131c are arranged in the order of blocks in the memory cell array 14a. In addition, pieces of defective block information d11, d12, d13, d14, d15, . . . , and do stored in the OTP-use defective block management table 131d are arranged in the order of blocks in the memory cell array 14a.

The OTP controller 131a stores, in the defective block information d21 in the merge-use defective block management table 131f, a value "0" obtained by performing logical addition of a value "0" of the defective block information d1 stored in the defective block management table 131c to a value "0" of the defective block information d11 stored in the OTP-use defective block management table 131d. The OTP controller 131a stores, in the defective block information d22 in the merge-use defective block management table 131f, a value "1" obtained by performing logical addition of a value "1" of the defective block information d2 stored in the defective block management table storage unit 13c to a value "0" of the defective block information d12 stored in the OTP-use defective block management table storage unit 13d.

While also repeating the same storing processing with respect to the other pieces of defective block information, the OTP controller 131a stores, in the defective block information dp in the merge-use defective block management table 131f, a value "0" obtained by performing logical addition of a value "0" of the defective block information dm stored in the defective block management table storage unit 13c to a value "0" of the defective block information do stored in the OTP-use defective block management table storage unit 13d.

To return to FIG. 6, FIG. 6 will be described again.

The memory controller 13a identifies a defective block in the memory cell array 14a by referring to the defective block information stored in the merge-use defective block management table 131f. In addition, the memory controller 13a removes a block whose defective block information is "1" from targets of writing of data. As described above, since the defective block information reflecting the state of the defective block in the memory cell array 14a at present is stored in the merge-use defective block management table 131f, it is possible to improve the reliability of data stored in the memory cell array 14a.

After the termination of the processing in Sequence Seq16, the OTP controller 131a backs up the merge-use defective block management table 131f to the OTP region 14b on a regular basis.

Hereinafter, backup processing for the merge-use defective block management table 131f will be described.

<Backup Processing for Merge-Use Defective Block Management Table 131f>

Figure 8:
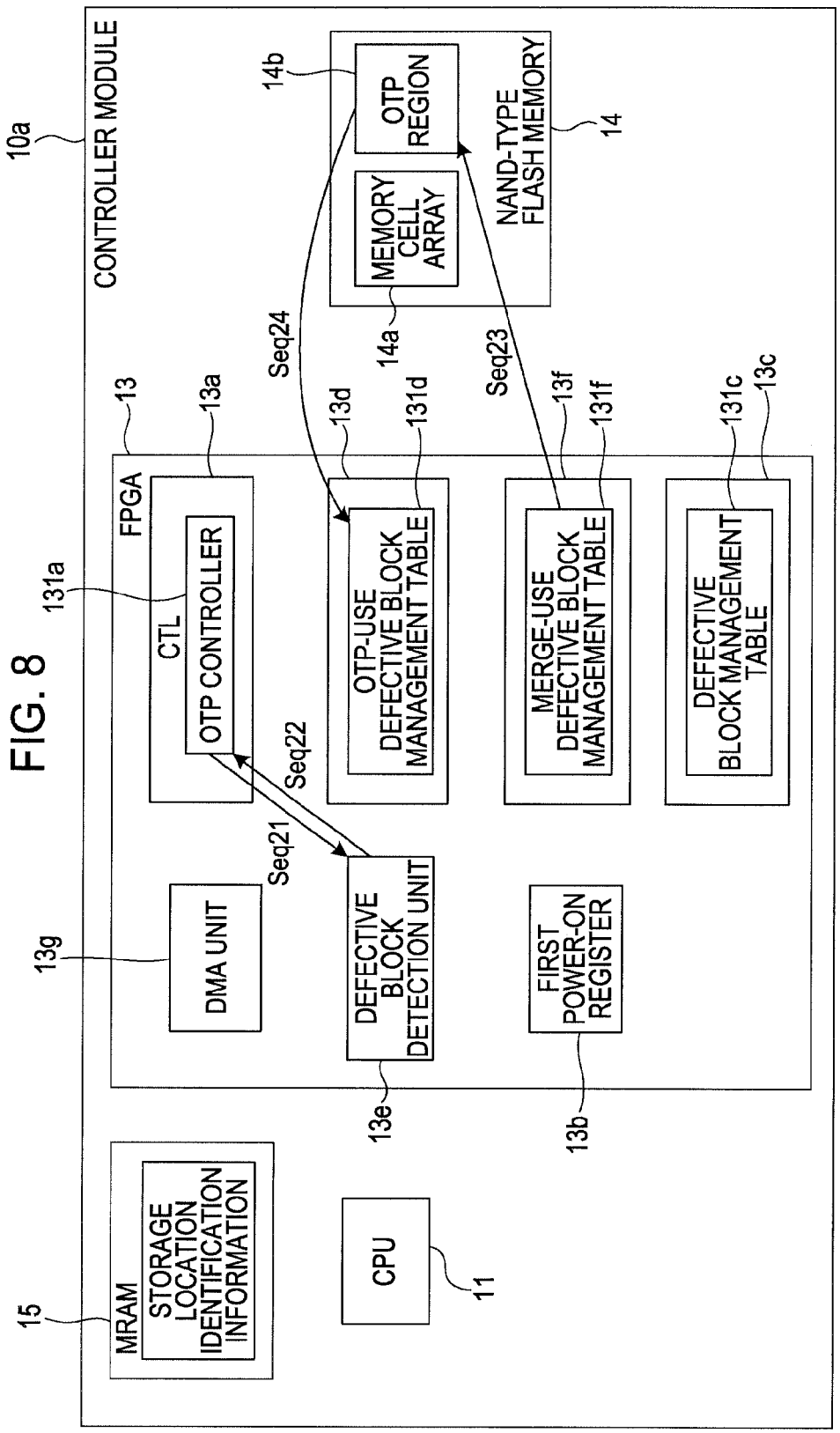
FIG. 8 is a diagram explaining backup processing for a merge-use defective block management table.

FIG. 8 is a diagram explaining the backup processing for the merge-use defective block management table.

[Seq21] The OTP controller 131a determines (calculates) the threshold value of the number of defective blocks, which is to be the criterion of a time when the merge-use defective block management table 131f is backed up to the OTP region 14b. The threshold value may be the total number of the number of defective blocks in the merge-use defective block management table 131f, or may be a difference between the number of defective blocks in the OTP-use defective block management table 131d and the number of defective blocks in the merge-use defective block management table 131f. In the present embodiment, a difference between the number of defective blocks in the OTP-use defective block management table 131d and the number of defective blocks in the merge-use defective block management table 131f is set as the threshold value of the number of defective blocks.

When the threshold value is determined, the number of blocks in the memory cell array 14a and the capacity (the number of pages) of the OTP region 14b are considered. For example, when the number of blocks is "512" and the number of pages of the OTP region 14b is "30 pages", the threshold value of the number of defective blocks is set to 512/30+1="18". Here, taking it into consideration that the defective block management table created at the time of the initialization setting has been already stored in the first page, "1" is added.

[Seq22] The OTP controller 131a monitors, on an as-needed basis or at a constant frequency, the number of defective blocks in the merge-use defective block management table 131f, detected by the defective block detection unit 13e.

[Seq23] Every time the number of defective blocks detected by the defective block detection unit 13e becomes greater than or equal to the threshold value set in Sequence Seq21, the OTP controller 131a writes the merge-use defective block management table 131f into a page in the OTP region 14b, the page being next to a page into which the defective block management table has been already written. The written page becomes a latest page at present.

In the example in which the threshold value of the number of defective blocks is set to "18", when a difference between the number of defective blocks in the OTP-use defective block management table 131*d* and the number of defective blocks in the merge-use defective block management table 131*f* becomes "18", the merge-use defective block management table 131*f* is written into a page in the OTP region 14*b* into which the merge-use defective block management table 131*f* has not been written yet, the page being next to a page into which the defective block management table has been already written.

[Seq24] At the time of next power-on, the OTP controller 131*a* reads out the defective block management table written in Seq23 from the OTP region 14*b*. In addition, the OTP controller 131*a* stores the read out defective block management table in the OTP-use defective block management table storage unit 13*d*.

Owing to the processing in Sequence Seq24, it is possible to also include defective block information, which has occurred during the operation, in the merge-use defective block management table 131*f* created by the OTP controller 131*a* at the time of the next power-on, in addition to the factory default defective block information. Accordingly, it is possible to improve the reliability of data stored in the NAND-type flash memory 14.

Next, an operation will be described that is performed when the NAND-type flash memory 14 is changed from the NAND-type flash memory 14 in which the merge-use defective block management table 131*f* has been written into the OTP region 14*b* therein to the NAND-type flash memory 14 in which the merge-use defective block management table 131*f* has not been written into the OTP region 14*b* therein.

<Operation of Controller Module 10*a* Performed when NAND-Type Flash Memory 14 is Replaced>

Figure 9:
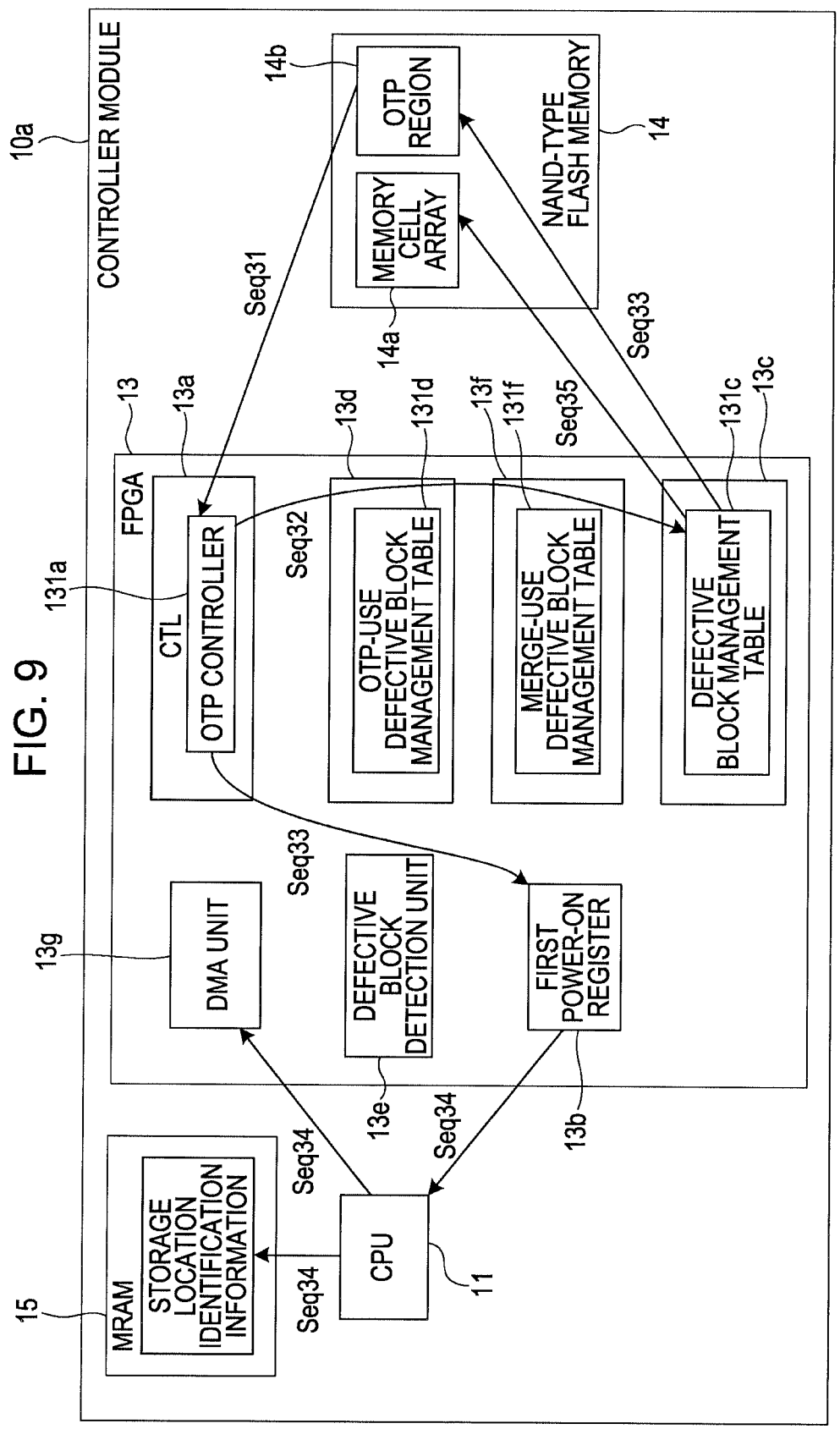
FIG. 9 is a diagram illustrating an operation of the controller module performed when a NAND-type flash memory is replaced.

FIG. 9 is a diagram illustrating the operation of the controller module performed when the NAND-type flash memory is replaced.

The operations of Sequences Seq31 to Seq33 illustrated hereinafter are the same as those of Sequences Seq1 to Seq3.

Seq31] The OTP controller 131*a* reads out the OTP region 14*b* in the NAND-type flash memory 14, and confirms that the OTP region 14*b* is in an erased state.

When the NAND-type flash memory 14 is replaced and the OTP region 14*b* is in an erased state, the OTP controller 131*a* may determine the first, power-on.

[Seq32] When determining the first power-on, the OTP controller 131*a* reads out the storage positions of all defective blocks in the NAND-type flash memory 14, namely, the defective block information stored in the first page of each block in the memory cell array 14*a*. In addition, on the basis of the read out defective block information, the OTP controller 131*a* confirms whether or not there is a defective block. In addition, the OTP controller 131*a* creates the defective block management table 131*c* storing therein a position where the defective block exists. The OTP controller 131*a* stores the created defective block management table 131*c* in the defective block management table storage unit 13*c*.

[Seq33] The OTP controller 131*a* writes the created defective block management table 131*c* into a page in the OTP region 14*b* in the NAND-type flash memory 14, the page being next to a page into which the defective block management table has been already written. The written page becomes a latest page at present. In addition, the OTP controller 131*a* sets the register value of the first power-on register 13*b* to "1".

The operation described this far is the initialization setting operation at the time of the first power-on. When the initialization setting operation is finished, the controller module 10*a* performs the operations of Seq34 and Seq35.

[Seq34] When the OTP controller 131*a* notifies the CPU 11 of the completion of the initialization setting, the CPU 11 confirms that the register value of the first power-on register 13*b* is "1". When it is confirmed that the register value of the first power-on register 13*b* is "1", the CPU 11 specifies the memory cell array 14*a* in the NAND-type flash memory 14 as the storage location of the defective block management table 131*c*. In addition, the CPU 11 activates the DMA unit 13*g* in the FPGA. In addition, the CPU 11 notifies the MRAM 15 of the storage location of the defective block management table 131*c* within the memory cell array 14*a*. At this time, while, in the MRAM 15, the storage location identification information of the defective block management table 131*c* within the memory cell array 14*a* before the replacement of the NAND-type flash memory 14 is stored, the MRAM 15 overwrites already-stored storage location identification information with the storage location identification information created on the basis of the storage location of the defective block management table 131*c*, given notice of by the CPU 11, and stores therein the created storage location identification information.

[Seq35] The OTP controller 131*a* writes the defective block management table 131*c* into the memory cell array 14*a*.

Since the first power-on is confirmed on the basis of the processing in Seq31, the OTP controller 131*a* can recognize that there is no defective block management table in the memory cell array 14*a* in the NAND-type flash memory 14. Accordingly, since the memory controller 13*a* does not fully erase the memory cell array 14*a* in accordance with the uncertainty of the data-writing state of the NAND-type flash memory 14, it is possible to suppress the disappearance of the defective block information.

Next, the operation of the controller module 10*a* will be described that is performed when the storage location identification information stored in the MRAM 15 disappears.

<Operation of Controller module 10*a* Performed When Storage Location Identification Information Stored in MRAM 15 Disappears>

Figure 10:
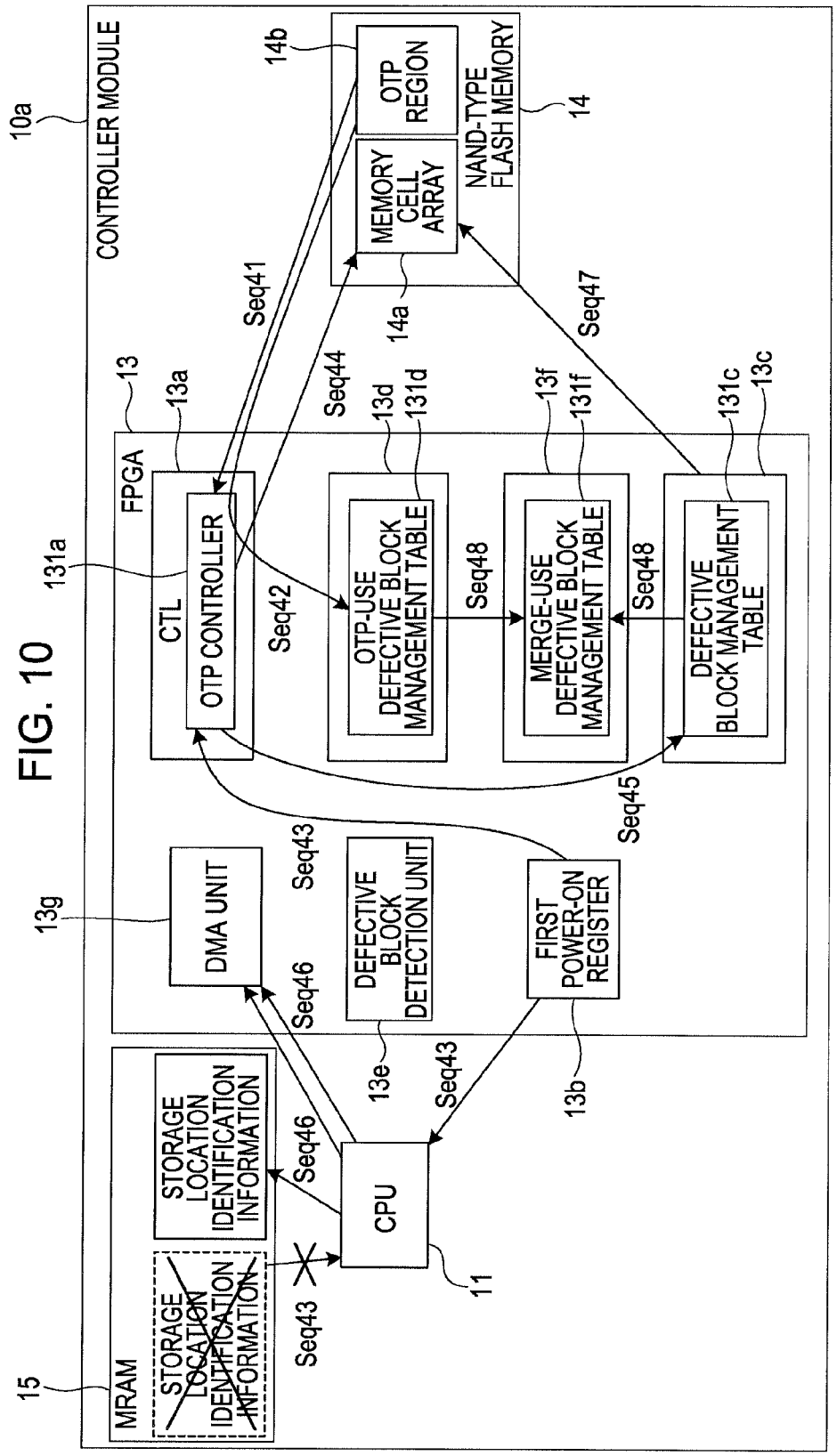
FIG. 10 is a diagram illustrating an operation of the controller module performed when storage location identification information stored in an MRAM disappears.

FIG. 10 is a diagram illustrating the operation of the controller module performed when the storage location identification information stored in an MRAM disappears.

[Seq41] The OTP controller 131*a* reads out the OTP region 14*b* in the NAND-type flash memory 14, and confirms whether or not the OTP region 14*b* is in an erased state.

Here, owing to the operation performed in Sequence Seq3 at the time of the first power-on, the defective block management table is stored in the OTP region 14*b*. Accordingly, at the time of the second or subsequent power-on, the OTP region 14*b* is not in an erased state. If the OTP region 14*b* is not in an erased state, the OTP controller 131*a* determines the second or subsequent power-on. At this time, the register value of the first power-on register 13*b* remains "0".

[Seq42] When determining the second or subsequent power-on, the OTP controller 131*a* reads out the defective block management table stored in the latest page, from the OTP region 14*b* in the NAND-type flash memory 14.

In addition, the OTP controller 131*a* stores the defective block management table read out from the OTP region 14*b* in the OTP-use defective block management table storage unit 13*d*. After storing the defective block management table read out from the OTP region 14*b* in the OTP-use defective block management table storage unit 13*d*, the OTP controller 131*a* notifies the CPU 11 of the completion of the initialization setting.

The operation described this far is the initialization setting operation at the time of the second or subsequent power-on. When the initialization setting operation is finished, the controller module 10a performs operations in Seq43 and subsequent Sequences.

[Seq43] When the OTP controller 131a notifies the CPU 11 of the completion of the initialization setting, the CPU 11 confirms the register value of the first power-on register 13b. When it is confirmed that the register value of the first power-on register 13b is "0", the CPU 11 determines the second or subsequent power-on, accesses the MRAM 15, and confirms the storage location of the defective block management table within the memory cell array 14a, on the basis of the storage location identification information. Since data in the MRAM 15 disappears, it is difficult for the CPU 11 to identify the storage location of the defective block management table within the memory cell array 14a. When it is difficult to identify the storage location of the defective block management table within the memory cell array 14a, the CPU 11 performs an operation for causing the OTP controller 131a to write the defective block management table into the memory cell array 14a again.

Specifically, in order to erase the defective block management table currently existing within the memory cell array 14a, the CPU 11 activates the DMA unit 13g in the FPGA 13 (activates an erase command).

[Seq44] The OTP controller 131a erases data stored in the memory cell array 14a in the NAND-type flash memory 14, in units of blocks. Namely, "1" is written into each of blocks in the memory cell array 14a. When "1" is written into each of blocks in the memory cell array 14a, the OTP controller 131a refers to the OTP-use defective block management table 131d. In addition, "1" is not written into a block of the defective block information corresponding to a portion in the OTP-use defective block management table 131d, into which "0" is written (the defective block information is not erased). Accordingly, it is possible to put the memory cell array 14a into a state in which the position of a defective block already occurring in the memory cell array 14a at the time of factory shipment and the position of a defective block newly occurring during the operation are reflected.

Furthermore, The OTP controller 131a writes "0" into a block in the memory cell array 14a, in which data is erased.

[Seq45] The OTP controller 131a sets corresponding defective block information in the defective block management table 131c to "1", with respect to a block in which a writing error occurs without "0" being written thereinto, as a result that "0" is written into a block in which a date erase error occurs, without data being erased, at the time of erasing of data in the memory cell array 14a and a block in which data in the memory cell array 14a is erased.

[Seq46] The CPU 11 specifies the storage location of the defective block management table 131c within the memory cell array 14a, created in Seq45, and activates the DMA unit 13g. In addition, the CPU 11 notifies the MRAM 15 of the storage location of the defective block management table 131c within the memory cell array 14a. Accordingly, the MRAM 15 stores the storage location identification information of the defective block management table 131c within the memory cell array 14a.

[Seq47] Owing to the activation of the DMA unit 13g by the CPU 11, the OTP controller 131a writes the defective block management table 131c into the storage location of the defective block management table 131c within the memory cell array 14a, of which the MRAM 15 is notified in Seq46.

[Seq48] The OTP controller 131a stores, in the merge-use defective block management table 131f, a value obtained by performing logical addition of each of pieces of the defective block information of the defective block management table 131c stored in the defective block management table storage unit 13c to each of pieces of the defective block information of the OTP-use defective block management table 131d stored in the OTP-use defective block management table storage unit 13d.

The memory controller 13a identifies a defective block in the memory cell array 14a by referring to the defective block information stored in the merge-use defective block management table 131f. In addition, the memory controller 13a removes a block whose defective block information is "1" from targets of writing of data.

By performing the processing operations in Sequences Seq43 to Seq48, it is possible to reflect the factory default defective block information in the defective block management table stored in the memory cell array 14a, when the storage location of the defective block management table within the memory cell array 14a is lost and a table is reconstructed.

Hereinafter, the above-mentioned processing performed in the OTP controller 131a will be described using a flowchart.

Figure 11:
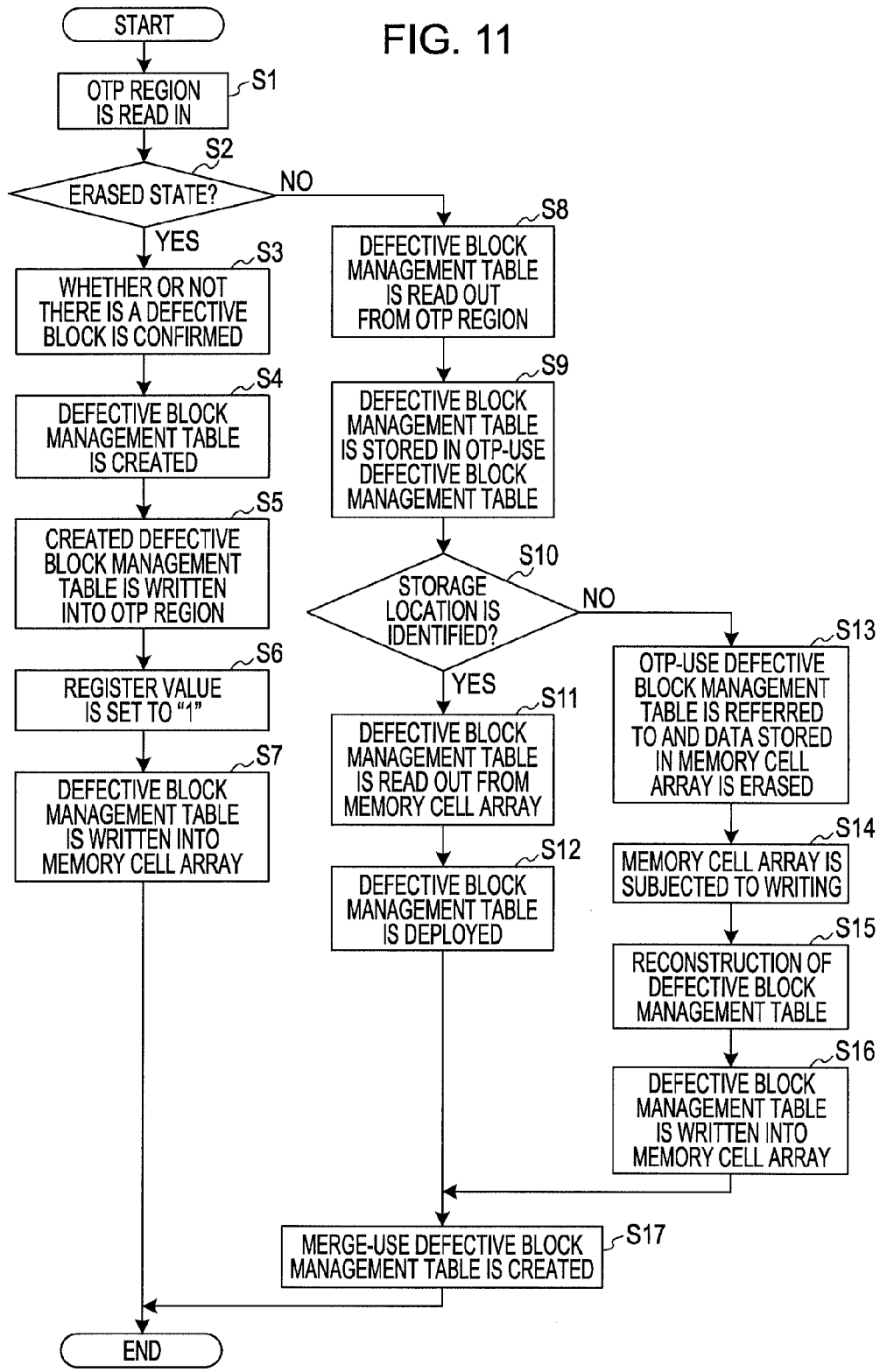
FIG. 11 is a flowchart illustrating processing performed in an OTP controller.

FIG. 11 is a flowchart illustrating the processing performed in the OTP controller.

[S1] The OTP controller 131a reads in the OTP region 14b.

[S2] The OTP controller 131a determines whether or not the first power-on register 13b is in an erased state. When the first power-on register 13b is in an erased state, namely, the first power-on is performed (Yes in S2), the operation transits to S3. When the first power-on register 13b is not in an erased state, namely, the second or subsequent power-on is performed (No in S2), the operation transits to S8.

[S3] The OTP controller 131a reads out the storage positions of all defective blocks in the NAND-type flash memory 14, namely, the defective block information stored in the first page of each block in the memory cell array 14a. In addition, the OTP controller 131a confirms whether or not there is a defective block, on the basis of the read out defective block information. After that, the operation transits to S4.

[S4] The OTP controller 131a creates the defective block management table 131c storing therein a position in which a defective block exists. The OTP controller 131a stores the created defective block management table 131c in the defective block management table storage unit 13c. After that, the operation transits to S5.

[S5] The OTP controller 131a writes the defective block management table 131c created in Step S4 into the OTP region 14b. After that, the operation transits to S6.

[S6] The OTP controller 131a sets the register value of the first power-on register 13b to "1". After that, the operation transits to S7.

[S7] Owing to the activation of the DMA unit 13g by the CPU 11, the OTP controller 131a writes the defective block management table 131c into the memory cell array 14a. After that, the processing in FIG. 11 is finished.

[S8] The OTP controller 131a reads out the defective block management table from the OTP region 14b. After that, the operation transits to S9.

[S9] The OTP controller 131a stores the defective block management table read out in S8 in the OTP-use defective block management table storage unit 13d. After that, the operation transits to S10.

[S10] The OTP controller 131a accesses the MRAM 15, and confirms the storage location of the defective block management table within the memory cell array 14a on the basis of the storage location identification information. When the storage location is identified (Yes in S10), the operation transits to S11. When the storage location is not identified (No in S10), the operation transits to S13.

[S11] The OTP controller 131a reads out the defective block management table from the memory cell array 14a. After that, the operation transits to S12.

[S12] The OTP controller 131a stores the defective block management table read out from the memory cell array 14a in S11 in the defective block management table storage unit 13c. After that, the operation transits to S17.

[S13] The OTP controller 131a erases data stored in the memory cell array 14a in units of blocks while referring to the OTP-use defective block management table 131d. After that, the operation transits to S14.

[S14] The OTP controller 131a writes "0" into a block within the memory cell array 14a, in which data is erased. After that, the operation transits to S15.

[S15] The OTP controller 131a confirms a block in which a data erase error occurs and a block in which a writing error occurs, and creates the defective block management table 131c in which the position of a defective block is reflected (the reconstruction of the defective block management table 131c). After that, the operation transits to S16.

[S16] The OTP controller 131a writes the defective block management table 131c created in S15 into the storage location of the defective block management table 131c within the memory cell array 14a, of which the CPU 11 has notified the MRAM 15. After that, the operation transits to S17.

[S17] The OTP controller 131a stores, in the merge-use defective block management table 131f, a value obtained by performing logical addition of each of pieces of the defective block information of the defective block management table 131c stored in the defective block management table storage unit 13c to each of pieces of the defective block information of the OTP-use defective block management table 131d stored in the OTP-use defective block management table storage unit 13d. After that, the operation in FIG. 11 is finished.

This is the end of the description of the processing performed in the OTP controller.

Next, the backup processing for the merge-use defective block management table 131f will be described using a flowchart.

Figure 12:
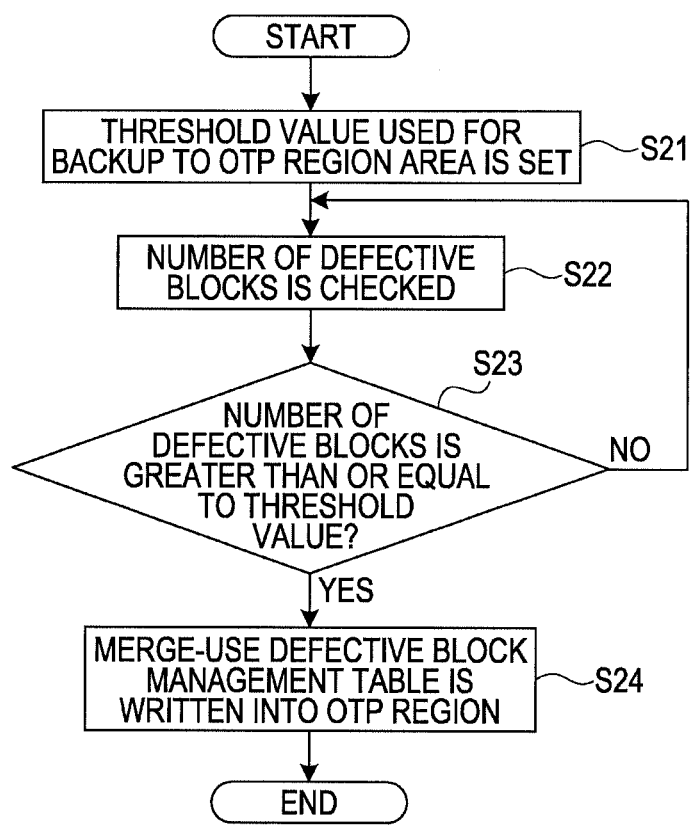
FIG. 12 is a flowchart illustrating the backup processing for the merge-use defective block management table.

FIG. 12 is a flowchart illustrating the backup processing for the merge-use defective block management table.

[S21] The OTP controller 131a determines the threshold value of the number of defective blocks, which is to be the criterion of a time when the merge-use defective block management table 131f is backed up to the OTP region 14b. After that, the operation transits to S22.

[S22] The OTP controller 131a confirms the number of defective blocks in the merge-use defective block management table 131f, detected by the defective block detection unit 13e. After that, the operation transits to S23.

[S23] The OTP controller 131a determines whether or not the number of defective blocks confirmed in S22 is greater than or equal to the threshold value determined in S21. When the number of defective blocks confirmed in S22 is greater than or equal to the threshold value determined in S21 (Yes in S23), the operation transits to S24. When the number of defective blocks confirmed in S22 is less than the threshold value determined in S21, the operation transits to S22.

[S24] The OTP controller 131a writes the merge-use defective block management table 131f into a new page in the OTP region 14b. After that, the operation in FIG. 12 is finished.

This is the end of the description of the backup processing for the merge-use defective block management table.

While the control device, the controller module, and the control method according to the present invention have been described on the basis of illustrated embodiments this far, the present invention is not limited to the embodiments, and the configurations of individual portions may be replaced with arbitrary configurations having the same functions. In addition, another arbitrary component or process may be added to the present invention.

In addition, the present invention may be a combination of more than one arbitrary configuration (feature) from among the described embodiments.

In addition, the above-described processing functions may be realized using a computer. In that case, a program is provided in which the processing contents of functions to be included in the FPGA 13 or the controller modules 10a, 10b, and 10c are described. The computer executes the program, thereby realizing the above-mentioned processing functions on the computer. The program in which the above-mentioned processing contents are described may be recorded in a computer-readable recording medium. Examples of the computer-readable recording medium include a magnetic storage device, an optical disk, a magneto-optical recording medium, a semiconductor memory, and the like. Examples of the magnetic storage device include a hard disk device (HDD), a flexible disk (FD), a magnetic tape, and the like. Examples of the optical disk include a DVD, a DVD-RAM, a CD-ROM/RW, and the like. Examples of the magneto-optical recording medium include a magneto-optical disk (MO) and the like.

When the program is distributed, portable recording media such as DVDs, CD-ROMs, and the like in which the program is recorded are marketed, for example. In addition, the program may be stored in a storage device in a server computer and the program may also be transferred from the server computer to other computers through a network.

For example, a computer that executes the program stores, in a storage device in the computer itself, the program recorded in the portable recording medium or the program transferred from the server computer. In addition, the computer reads out the program from the storage device in the computer itself, and executes processing according to the program. In addition, the computer may also directly read out the program from the portable recording medium and execute processing according to the program. In addition, the computer may also sequentially execute processing according to the received program every time the program is transferred from the server computer connected through the network.

In addition, at least a portion of the above-described processing functions may also be realized using an electronic circuit such as a digital signal processor (DSP), an application specific integrated circuit (ASIC), a programmable logic device (PLD), or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
   a storage device that includes a first storage area including
      a plurality of blocks into which data can be written more than once, each block stores a flag indicating whether or not the block is allowed to be used, and a second storage area into which data can be written only once;

a creation unit configured to create, based on the flag stored in the blocks, a flag management information for managing whether or not data can be stored in the block of the storage device;

a management information controller configured to store the flag management information in the second storage area; and a detection unit configured to detect a block that is not allowed to be used, wherein the management information controller determines, based on a detection result of the detection unit, that a number of blocks that are not allowed to be used is increased, and stores the flag management information reflecting the detection result of the detection unit in the second storage area when the determined number becomes greater than or equal to a predetermined value.

2. The control device according to claim 1, wherein the creation unit confirms whether or not any data is written in the second storage area, and creates the flag management information when it is confirmed that data is not written in the second storage area.

3. The control device according to claim 1, wherein the management information controller confirms whether or not any data is written in the second storage area, and reads out the flag management information from the second storage area when it is confirmed that data is written in the second storage area.

4. The control device according to claim 1, wherein the management information controller stores the flag management information in the first storage area, the management information controller reads out the flag management information stored in the first storage area after confirming whether or not any data is written in the second storage area, and the control device writes data into the first storage area or reads out data from the first storage area, on the basis of the flag management information read out from the second storage area and the flag management information read out from the first storage area.

5. The control device according to claim 1, wherein the management information controller stores the flag management information in the first storage area, and when a storage location for storing the flag management information to be stored in the first storage area is not identified, the creation unit stores the flag management information which is read out from the second storage area.

6. The control device according to claim 1, further comprising:

a register configured to be set when the management information controller stores the flag management information in the second storage area, wherein the creation unit confirms whether or not any data is written in the second storage area on the basis of whether or not the register is set.

7. A controller module comprising:

a control device that controls a storage device that includes a first storage area including a plurality of blocks into which data can be written more than once and a second storage area into which data can be written only once, the first storage area stores a flag for each of the blocks indicating whether or not the corresponding block is allowed to be used;

a management information controller configured to store a flag management information in the second storage area;

a register configured to be set when the management information controller stores the flag management information in the second storage area;

a CPU that executes different processing on the basis of whether or not the register is set, and stores the flag management information in the first storage area; and a detection unit configured to detect a block that is not allowed to be used, wherein the management information controller determines, based on a detection result of the detection unit, that a number of blocks that are not allowed to be used is increased, and stores the flag management information reflecting the detection result of the detection unit in the second storage area when the determined number becomes greater than or equal to a predetermined value.

8. A control method for a control device controlling a storage device that includes a first storage area including a plurality of blocks into which data can be written more than once and a second storage area into which data can be written only once, wherein the first storage area further stores a flag for each of the blocks, the flag indicating whether or not the block is allowed to be used, the control method comprising:

creating flag management information for managing whether or not data can be stored with respect to each block of the storage device, on the basis of the flag;

causing the created flag management information to be stored in the second storage area;

detecting a block that is not allowed to be used;

determining, based on a result of the detecting, that a number of blocks that are not allowed to be used is increased, and storing the flag management information reflecting the detection result of the detecting in the second storage area when the determined number becomes greater than or equal to a predetermined value.

* * * * *